United States Patent
van Groenestijn

(10) Patent No.: US 10,067,254 B2
(45) Date of Patent: Sep. 4, 2018

(54) REMOVAL OF AN ESTIMATED ACQUISITION EFFECT FROM A MARINE SURVEY MEASUREMENT

(71) Applicant: PGS Geophysical AS, Oslo (NO)

(72) Inventor: Gert-Jan Adriaan van Groenestijn, Leiden (NL)

(73) Assignee: PGS Geophysical AS, Oslo (NO)

( * ) Notice: Subject to any disclaimer, the term of this patent is extended or adjusted under 35 U.S.C. 154(b) by 239 days.

(21) Appl. No.: 14/991,542

(22) Filed: Jan. 8, 2016

(65) Prior Publication Data

US 2016/0238727 A1 Aug. 18, 2016

Related U.S. Application Data

(60) Provisional application No. 62/116,639, filed on Feb. 16, 2015.

(51) Int. Cl.
*G01V 1/00* (2006.01)
*G01V 1/36* (2006.01)

(52) U.S. Cl.
CPC ..................... *G01V 1/36* (2013.01)

(58) Field of Classification Search
None
See application file for complete search history.

(56) References Cited

U.S. PATENT DOCUMENTS

| | | |
|---|---|---|
| H1693 H * | 11/1997 | Thornton .................. 702/17 |
| 7,333,393 B2 | 2/2008 | Van Vossen et al. |
| 2003/0112704 A1 | 6/2003 | Goff et al. |
| 2009/0157316 A1 | 6/2009 | Alumbaugh et al. |
| 2013/0179137 A1 | 7/2013 | Mullur et al. |
| 2014/0280416 A1 | 9/2014 | Van Borselen |
| 2015/0287422 A1 | 10/2015 | Short et al. |
| 2015/0301211 A1 | 10/2015 | Lacombe et al. |
| 2015/0355353 A1 | 12/2015 | Whitaker et al. |
| 2015/0362622 A1 | 12/2015 | Denli et al. |
| 2015/0369937 A1 | 12/2015 | Bergey et al. |

* cited by examiner

*Primary Examiner* — Cory Eskridge

(57) ABSTRACT

An acquisition effect of a marine survey measurement can be parameterized as a function of time to define a parameterized acquisition effect and a subsurface effect of the marine survey measurement can be parameterized as a function of position to define a parameterized subsurface effect. The acquisition effect and the subsurface effect can be estimated based on the parameterized acquisition effect and the parameterized subsurface effect to define an estimated acquisition effect and an estimated subsurface effect, respectively. The estimated acquisition effect can be removed from the marine survey measurement.

23 Claims, 9 Drawing Sheets

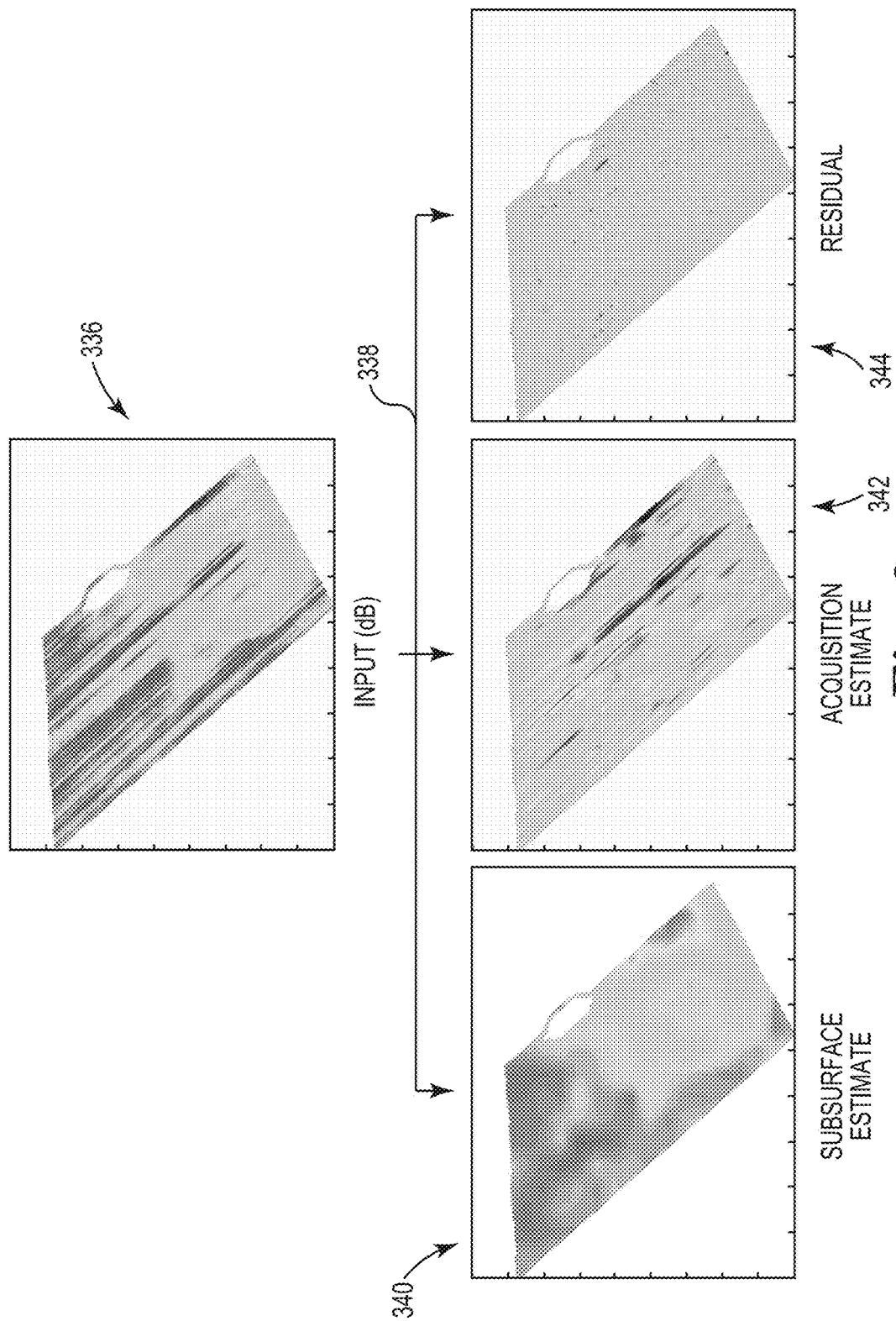

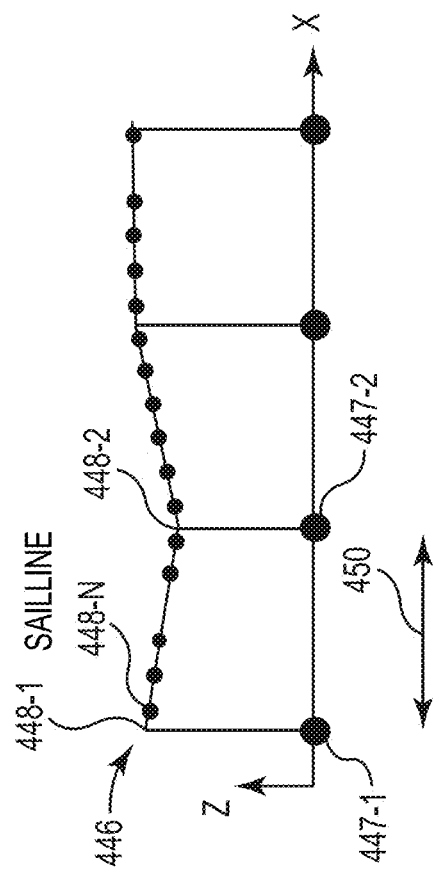
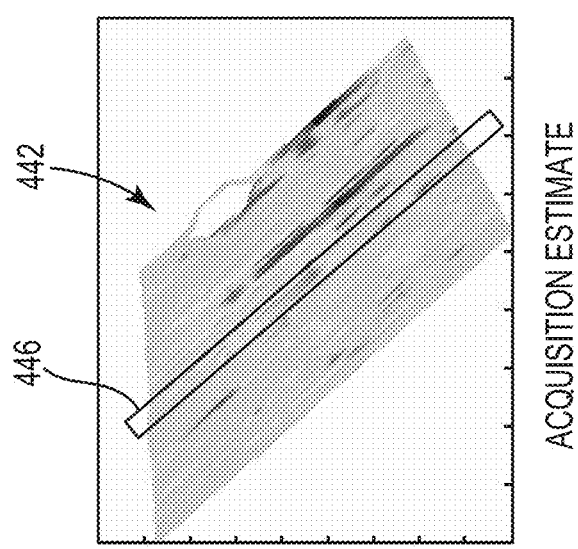
Fig. 4A
Fig. 4B

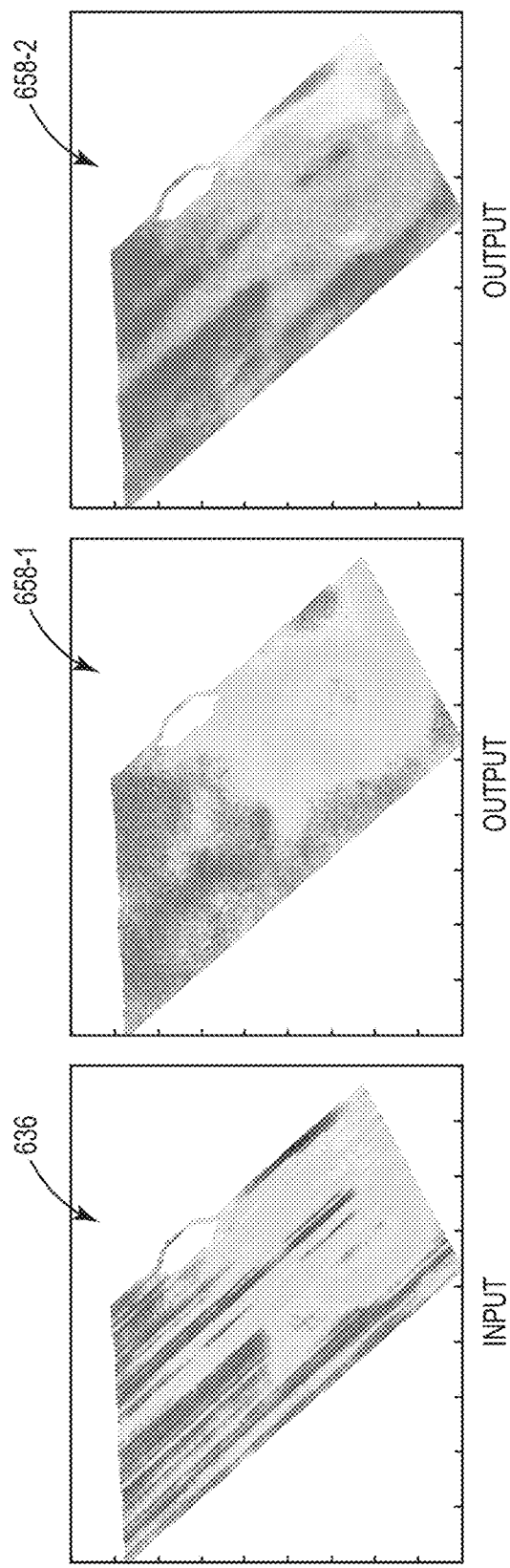

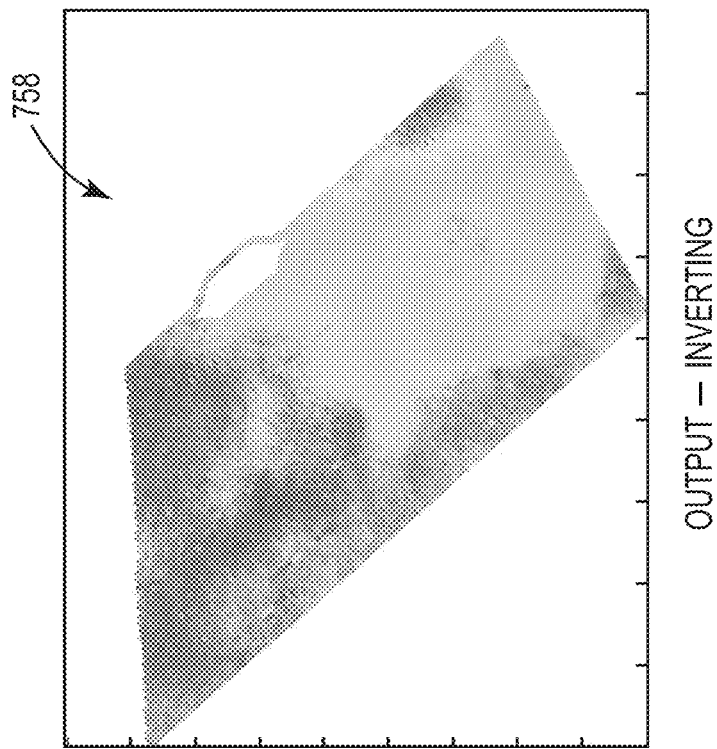
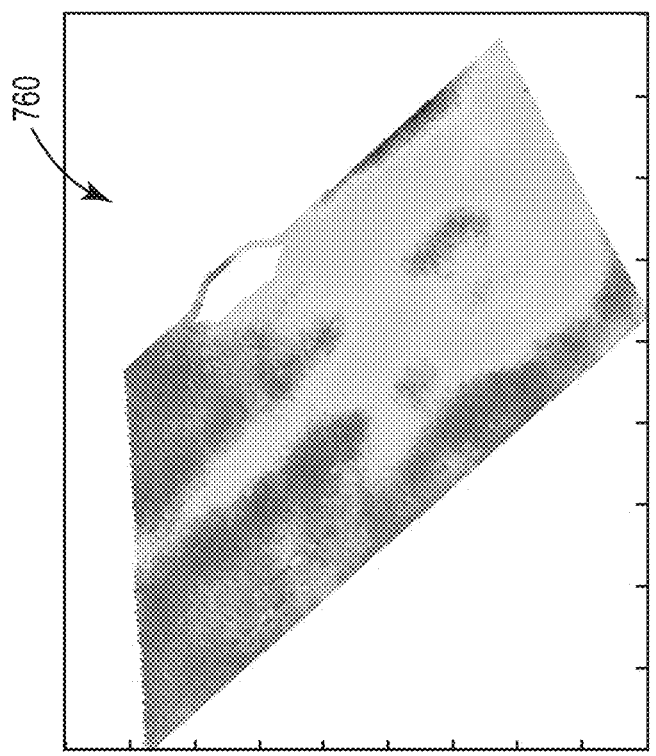
Fig. 7B
Fig. 7A
PRIOR ART

```
┌─────────────────────────────────────────────────────────────┐
│ OBTAINING A RESPECTIVE ROOT MEAN SQUARE (RMS) AMPLITUDE FOR │
│ EACH OF A PLURALITY OF MARINE SURVEY MEASUREMENTS, WHEREIN  │
│ A LOGARITHMIC VALUE OF THE RESPECTIVE RMS AMPLITUDE IS A    │
│ SUM OF A SUBSURFACE EFFECT AND AN ACQUISITION EFFECT        │
└─────────────────────────────────────────────────────────────┘
                              │ ⌐1088
                              │
┌─────────────────────────────────────────────────────────────┐
│ PARAMETERIZING THE ACQUISITION EFFECT AS A FUNCTION OF TIME │
│ WITH A SOURCE ACTUATION INTERVAL TO DEFINE A PARAMETERIZED  │
│                    ACQUISITION EFFECT                       │
└─────────────────────────────────────────────────────────────┘
                              │ ⌐1090
                              │
┌─────────────────────────────────────────────────────────────┐
│     PARAMETERIZING THE SUBSURFACE EFFECT AS A FUNCTION OF   │
│   POSITION WITH A POSITIONAL INTERVAL IN A FIRST DIRECTION AND│
│   IN A SECOND DIRECTION ORTHOGONAL TO THE FIRST DIRECTION TO│
│            DEFINE A PARAMETERIZED SUBSURFACE EFFECT         │
└─────────────────────────────────────────────────────────────┘
                              │ ⌐1092
                              │
┌─────────────────────────────────────────────────────────────┐
│       ESTIMATING THE ACQUISITION EFFECT AND THE SUBSURFACE  │
│     EFFECT BASED ON THE LOGARITHMIC VALUE OF THE RESPECTIVE │
│        RMS AMPLITUDE, THE PARAMETERIZED ACQUISITION EFFECT  │
│     AND THE PARAMETERIZED SUBSURFACE EFFECT TO DEFINE AN    │
│                 ESTIMATED ACQUISITION EFFECT                │
└─────────────────────────────────────────────────────────────┘
                              │ ⌐1094
                              │
┌─────────────────────────────────────────────────────────────┐
│    REMOVING THE ESTIMATED ACQUISITION EFFECT FROM THE       │
│         PLURALITY OF MARINE SURVEY MEASUREMENTS             │
└─────────────────────────────────────────────────────────────┘
                                                   ⌐1096
```

Fig. 10

REMOVAL OF AN ESTIMATED ACQUISITION EFFECT FROM A MARINE SURVEY MEASUREMENT

CROSS-REFERENCE TO RELATED APPLICATIONS

This application claims priority to U.S. Provisional Application 62/116,639, filed Feb. 16, 2015, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more sources below the sea surface and over a subterranean formation to be surveyed for mineral deposits. Receivers may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be air guns, marine vibrators, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the sea surface. The receivers thereby measure a wavefield that was initiated by the actuation of the source.

BRIEF DESCRIPTION OF THE DRAWINGS

FIG. 3 illustrates a root mean square amplitude map for a marine survey measurement and an inversion thereof into a sum of an estimate of a subsurface effect, an estimate of an acquisition effect, and a residual.

FIG. 4A illustrates the estimate of the acquisition effect of FIG. 3 with a sail line identified.

FIG. 4B illustrates the sail line of FIG. 4A in more detail.

FIG. 6A illustrates the root mean square amplitude map of FIG. 3.

FIG. 6B illustrates a first output after removing the estimated acquisition effect.

FIG. 6C illustrates a second output after removing the estimated acquisition effect.

FIG. 7A illustrates the root mean square amplitude map of FIG. 3 after a smoothing process according to at least one previous approach.

FIG. 7B illustrates the same image as FIG. 6B for comparison to FIG. 7A.

FIG. 10 illustrates a method flow diagram for removal of an estimated acquisition effect from a marine survey measurement.

DETAILED DESCRIPTION

Figure 1:
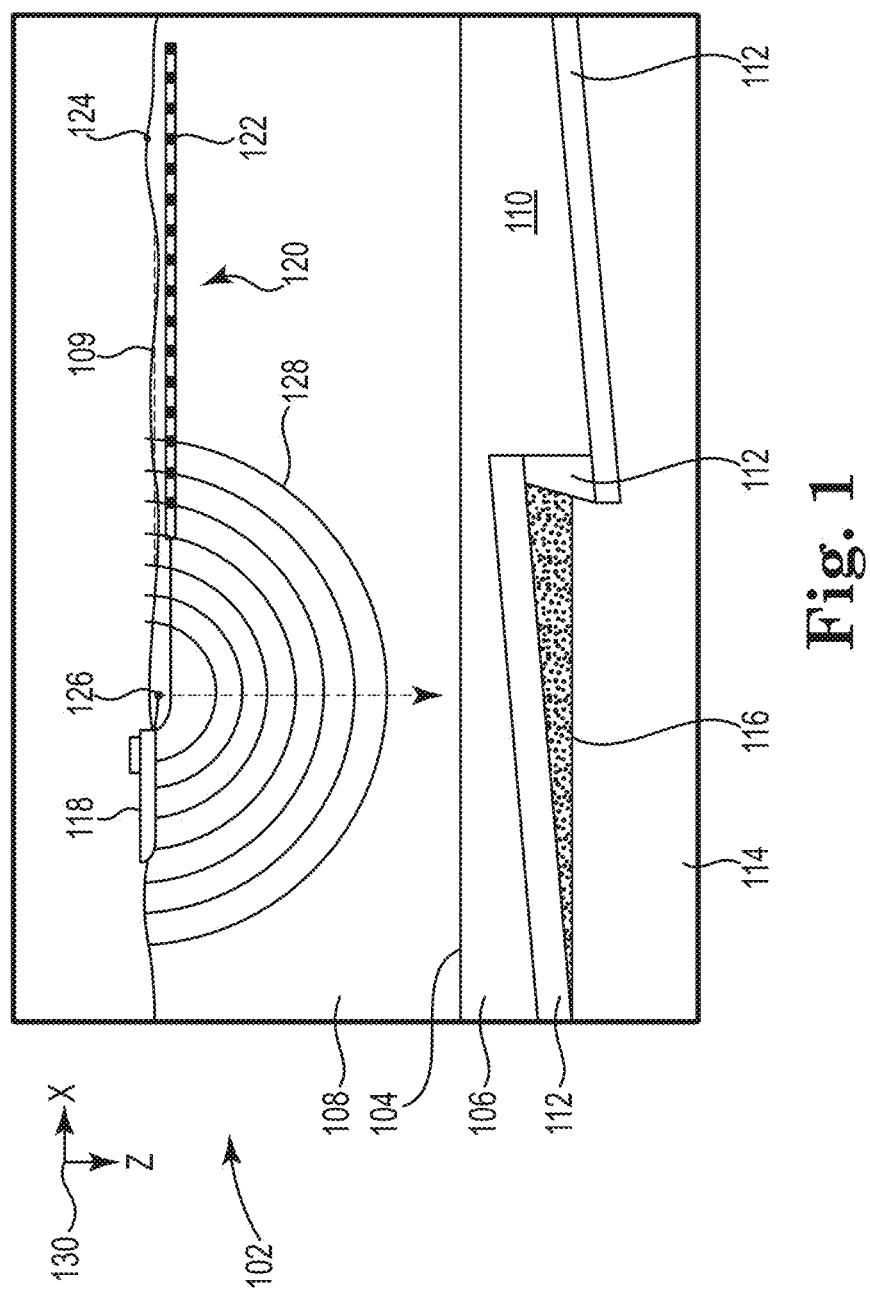
FIG. 1 illustrates an elevation or xz-plane view of marine surveying in which signals are emitted by a source for recording by receivers for processing and analysis in order to help characterize the structures and distributions of features and materials underlying the surface of the earth.

The present disclosure is related to removal of an estimated acquisition effect from a marine survey measurement. As used herein, a "marine survey measurement" refers to the result of the marine survey (the acquired data that resulted from the measurement) rather than the act of performing the marine survey (the act of measuring). Thus, the description of the estimated acquisition effect being removed from the marine survey measurement means that the acquisition effect is removed from the data. The description does not mean that the acquisition effect is somehow removed or prevented from occurring during the act of measuring. Although the present disclosure primarily discusses marine survey measurements, at least one embodiment of the present disclosure is related to removal of an estimated acquisition effect from a land survey measurement. The various descriptions of marine survey measurements herein can also be applied to land survey measurements.

Goals of marine survey processing can include mathematically transforming recorded reflections into images of the earth's subsurface. For example, marine survey processing methods can include mathematically simulating wave propagation using a computer, where boundary data from a sea surface can be extrapolated into a model of the subsurface. The boundary data at the sea surface can consist of two parts: a source wavefield, and a receiver wavefield. A signal emitted by a source or modeled as being emitted by a modeled source is called the "source wavefield." Examples of sources include air guns, marine vibrators, and electromagnetic sources, among others. A signal measured by a receiver or modeled as being received by a modeled receiver is called the "receiver wavefield."

Some wave equation imaging methods can include propagating source and receiver wavefields from the sea surface into an earth model (e.g., subsurface model) and can produce an image by computing the locations where a source wavefield and a receiver wavefield are in phase. It would be advantageous if marine surveys were time-invariant, meaning that the point of time at which a measurement takes place should not have an effect on the measurement. However, acquisition effects can affect marine survey measurements, making the marine survey time-variant. At least one embodiment of the present disclosure can remove an acquisition effect from a marine survey measurement. In at least one instance, the acquisition effect can otherwise cause a change in a marine survey measurement, where the change is not related to the thing being measured. That is, the acquisition effect can be a time-variant effect in the marine survey measurement rather than a position-variant effect in the marine survey measurement as described in more detail below.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 658 may reference element "58" in FIG. 6B, and a similar element may be referenced as 758 in FIG. 7B. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an elevation or xz-plane 130 view of marine surveying in which signals are emitted by a source 126 for recording by receivers 122 for processing and analysis in order to help characterize the structures and distributions of features and materials underlying the surface of the earth. For example, such processing can include removing an estimated acquisition effect from a marine survey measurement as described herein. FIG. 1 shows a domain volume 102 of the earth's surface comprising a subsurface volume 106 of sediment and rock below the surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, second, underlying rock layer 114, and hydrocarbon-saturated layer 116. One or more elements of the subsurface volume 106, such as the first sediment layer 110 and the first uplifted rock layer 112, can be an overburden for the hydrocarbon-saturated layer 116. In some instances, the overburden may include salt.

FIG. 1 shows an example of a marine survey vessel 118 equipped to carry out marine surveys. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which receivers may be coupled. In one type of marine survey, each receiver, such as the receiver 122 represented by the shaded disk in FIG. 1, comprises a pair of sensors including a geophone that detects particle displacement within the water by detecting particle motion variation, such as velocities or accelerations, and/or a hydrophone that detects variations in pressure. In one type of marine survey, each receiver, such as receiver 122, comprises an electromagnetic receiver that detects electromagnetic energy within the water. The streamers 120 and the marine survey vessel 118 can include sensing electronics and data-processing facilities that allow receiver readings to be correlated with absolute positions on the sea surface and absolute three-dimensional positions with respect to a three-dimensional coordinate system. In FIG. 1, the receivers along the streamers are shown to lie below the sea surface 109, with the receiver positions correlated with overlying surface positions, such as a surface position 124 correlated with the position of receiver 122. The marine survey vessel 118 can also tow one or more sources 126 that produce signals as the marine survey vessel 118 and streamers 120 move across the sea surface 109. Sources 126 and/or streamers 120 may also be towed by other vessels, or may be otherwise disposed in fluid volume 108. For example, receivers may be located on ocean bottom cables or nodes fixed at or near the surface 104, and sources 126 may also be disposed in a nearly-fixed or fixed configuration. For the sake of efficiency, illustrations and descriptions herein show receivers located on streamers, but it should be understood that references to receivers located on a "streamer" or "cable" should be read to refer equally to receivers located on a towed streamer, an ocean bottom receiver cable, and/or an array of nodes.

FIG. 1 shows an expanding, spherical signal, illustrated as semicircles of increasing radius centered at the source 126, representing a down-going wavefield 128, following a signal emitted by the source 126. The down-going wavefield 128 is, in effect, shown in a vertical plane cross section in FIG. 1. The outward and downward expanding down-going wavefield 128 may eventually reach the surface 104, at which point the outward and downward expanding down-going wavefield 128 may partially scatter, may partially reflect back toward the streamers 120, and may partially refract downward into the subsurface volume 106, becoming elastic signals within the subsurface volume 106.

Figure 2:
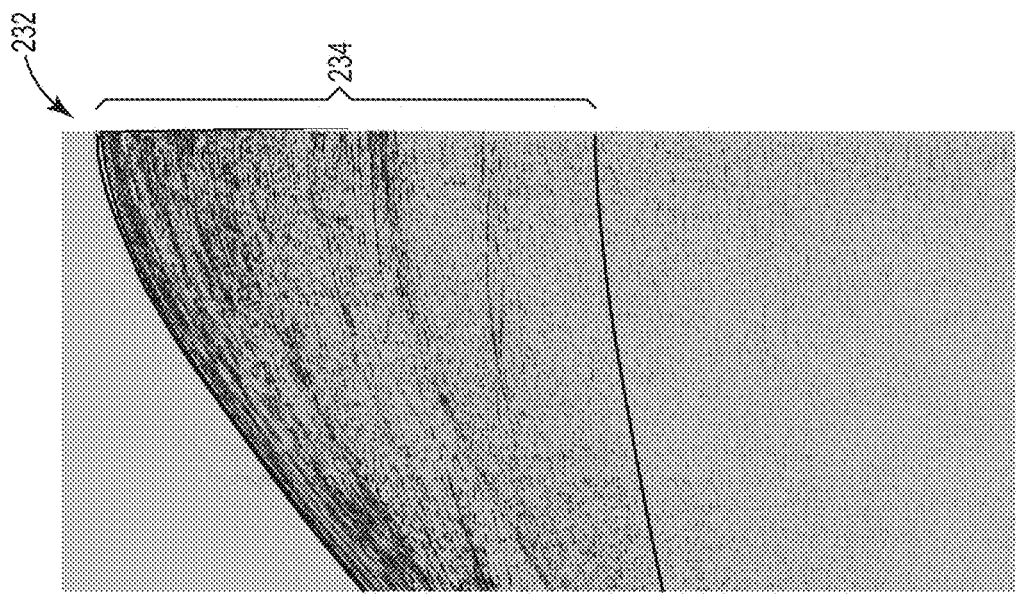
FIG. 2 illustrates an example of a marine survey measurement.

FIG. 2 illustrates an example of a marine survey measurement 232. An example of the marine survey measurement 232 is a gather, as illustrated. Data comprising a marine survey measurement by each receiver can be a time series that includes a number of consecutively, continuously, or near-continuously measured values, called amplitudes, separated in time by a sample rate (unless continuous). The time series is called a trace, which may include many (e.g., thousands) of samples. The trace is a recording of a subsurface response to energy from a source, where a portion of the energy is reflected and detected by a receiver as described above. The trace records variations in a time-dependent amplitude that represents energy of a wavefield measured by the receiver. Traces can be collected to form a "gather" that can be processed using various computational techniques in order to obtain information about the subsurface. The gather can be for receivers located on one streamer or for receivers located on more than one streamer.

Marine survey measurements can be sorted into domains, where a domain is a collection of gathers that shares a common geometrical attribute with respect to a position of the marine survey measurement. Examples of such domains include a common-actuation domain (sometimes referred to as a common-shot domain), common-offset domain, common-receiver domain, and common-midpoint domain, among others. A gather in a common-actuation domain represents a marine survey measurement from a plurality of receivers for one source actuation. A gather in a common-offset domain represents a marine survey measurement from a plurality of receivers for a plurality of sources, where the offset between the source-receiver pairs in the gather is approximately equal. As used herein, the offsets being approximately equal means that the offsets between the pairs are within a range of being equal (e.g., 25 meters) and that the offsets between respective source-receiver pairs in the gather are closer to being equal than the offset between one member of a particular source-receiver pair and a different source or receiver. A gather in a common-receiver domain represents a marine survey measurement from one receiver for actuations of a plurality of sources. A gather in a common-midpoint domain represents a marine survey measurement from a plurality of receivers based on actuation of a plurality of sources, where the energy from the sources shares a common reflection point ("common midpoint") between the sources and the receivers.

The marine survey measurement 232 can be outfitted with a user-defined window 234 to select a portion of the marine survey measurement 232 for preprocessing. In at least one embodiment, the data inside the user-defined window 234 can be used to calculate a root mean square value related to a particular source actuation. The user-defined window 234 can be rectangular, for example, if the input data is normal moveout (NMO) corrected or the user-defined window 234 can vary with offset based on provided velocity. The traces from different source-receiver pairs may be corrected during processing to remove effects of different source-receiver offsets in a process called NMO. The distance from a source to a receiver is called an offset. The result of an NMO process is that the wavelets are aligned in time. After NMO corrections, traces from different records with a common reflection point may be stacked to form a single trace, which can improve a signal-to-noise ratio, reduce noise, improve data quality, and/or reduce the overall amount of data.

A marine survey measurement 232 can be affected by various parameters. For example, a subsurface effect can have a position-variant and time-invariant (assumed here for simplicity) effect on the marine survey measurement 232. For example, a marine survey measurement 232 over more than one position can result in different responses for the different positions. A subsurface effect is a change in the marine survey measurement 232 attributable to a change in a subsurface response. A subsurface response describes the energy that is returned from the subsurface during a marine survey. Examples of factors that can change a subsurface response include a composition, density, shape, or other physical characteristics of the sub surface.

An acquisition effect can have a time-variant effect on the marine survey measurement 232. An acquisition effect is a change in the marine survey measurement 232 attributable to a change in an acquisition circumstance. An acquisition circumstance is a condition relevant to the acquisition of the marine survey measurement 232. Some acquisition circumstances can be attributable to the marine survey equipment, such as a source actuation frequency, a source actuation sequence, a source pressure, a source volume, a source energy, a receiver sensitivity, and a phase of a source input signal, among others. A source actuation frequency and/or sequence can change over time, for example, if there is a delay in actuation of one or more sources versus a desired source actuation frequency and/or sequence. A source pressure and/or volume can change over time, for example, during operation of air guns where the gun pressure and/or volume can increase or decrease over time during repeated operation. A source energy can change over time for an electromagnetic source due to power supply and/or transmission fluctuations of the marine survey equipment. A receiver sensitivity can change over time, for example, due to power fluctuations and/or the growth of barnacles on streamers. A phase of a source input signal can change over time, for example, where there is a delay in an actuation time of some but not all of the individual source units in a source array. Some acquisition circumstances may be independent of the marine survey equipment (although they may affect the marine survey equipment) such as a temperature of a water column between the subsurface and a receiver and an acoustic property of the water column, such as the speed of sound in the water column. An acoustic property is an attribute or quality relating to transmission of a signal in a medium. Some acoustic properties of the water may be regarded as a function of temperature. Such acoustic properties can be time-variant because the temperature of the water can change over time. Any acquisition circumstance can change over time.

At least one embodiment of the present disclosure estimates the acquisition effect and the subsurface effect by parameterizing the acquisition effect as a function of time and the subsurface effect as a function of position. The parameterization of the acquisition effect represents the acquisition effect in terms of parameters relating to time. The parameterization of the subsurface effect represents the subsurface effect in terms of parameters relating to position. The parameterization can be done in a forward model and then the forward model can be used to estimate both the acquisition effect and the subsurface effect. As the acquisition effect can be a time-variant effect in the marine survey measurement rather than a position-variant effect, it can be parameterized as a function of time. As the subsurface effect can have a position-variant and time-invariant effect on the marine survey measurement, it can be parameterized as a function of position. Once the changes caused by the acquisition effects are estimated, the acquired data comprising the marine survey measurement can be corrected by removing the estimated acquisition effect. After correction, the remaining changes present in the data can represent those changes caused by the subsurface, which may be the desired result of marine surveying.

FIG. 3 illustrates a root mean square (RMS) amplitude map 336 for a marine survey measurement and an inversion 338 thereof into a sum of an estimate of a subsurface effect 340, an estimate of an acquisition effect 342, and a residual 344. The residual 344 is a portion of the RMS amplitude map 336 that is not attributable to either the estimate of the subsurface effect 340 or the estimate of the acquisition effect 342. The RMS amplitude map 336 reflects the RMS amplitude for a gather, such as that illustrated for the marine survey measurement 232 in FIG. 2. The RMS amplitude for each pixel in the marine survey measurement 232 can be calculated and plotted on the RMS amplitude map 336. The output of such a calculation can include the RMS amplitude value, which is a consequence of the acquisition effect of the marine survey measurement and the subsurface effect of the marine survey measurement. The output can also include a geographic position, which can be represented in x-y coordinates (see FIG. 5B) and/or as an average common midpoint position. The output can also include an acquisition position (e.g., a sail line as shown in FIG. 4B) and a correspondence between the actuation position and a particular actuation of an actuation sequence, which can be a function of time.

The RMS amplitude map 336 represents a product of an estimate of a subsurface effect 340, an estimate of an acquisition effect 342, and a residual 344 (if present). The RMS amplitude map 336 can be inverted 338 such that a logarithmic (Decibel) value of the RMS amplitude map ($A_{input}$) can be expressed as a sum of a logarithmic value of the estimate of a subsurface effect as an amplitude ($A_{subsurface}$), a logarithmic value of the estimate of an acquisition effect as an amplitude ($A_{acquisition}$), and a logarithmic value of the residual as an amplitude ($A_{residual}$):

$$A_{input} = A_{subsurface} + A_{acquisition} + A_{residual} \quad (1)$$

If there is no residual, then $A_{residual}$ is zero, which is the same as the sum of only the $A_{subsurface}$ and $A_{acquisition}$. The estimate of the subsurface effect 340 indicates the portion of the amplitudes caused by reflections from the subsurface. The estimate of the acquisition effect 342 indicates the portion of the amplitudes that can be attributed to the acquisition effect. If there was no acquisition effect and no residual, then the entire marine survey measurement would only represent the subsurface effect.

FIG. 4A illustrates the estimate of the acquisition effect 442 of FIG. 3 with a sail line 446 identified. As described herein, an acquisition effect 442 can change over time, thus different sail lines, which correspond to acquisition positions, can have different acquisition effects. Although the term "sail line" is used herein, this does not imply that the marine survey vessel must travel in a straight line. Rather, "sail line" indicates the path that the marine survey vessel follows, whatever its shape. Different acquisition effects can show up as stripes when an RMS amplitude map is plotted (see the diagonal lines in the RMS amplitude map 336 in FIG. 3). These stripes can cause artefacts in marine survey measurement processing algorithms, and therefore should be removed.

Although some embodiments of the present disclosure may be referred to as de-striping, embodiments are generally not analogous to removing so-called "acquisition footprints" from marine survey measurements. An acquisition footprint is a consequence of the illumination of the subsurface by positioning the marine survey equipment in a specific way, and not a consequence of time-variant changes. An acquisition footprint can present itself as an amplitude stripe in time slices or horizon slices produced from three dimensional seismic data volumes.

FIG. 4B illustrates the sail line 446 of FIG. 4A in more detail. An actuation axis (the x-axis) is a function of a point in time. The z-axis is an indication of amplitude associated with each source actuation. For example, source actuation 447-1 is associated with the amplitude 448-1 on the parameterization of the estimated acquisition effect 442 and source actuation 447-2 is associated with the amplitude 448-2. Because the source actuation 447-1 is closer to the origin of the x-axis, it is an earlier source actuation than the source actuation 447-2. Although source actuation 447-2 is later than source actuation 447-1, there may be other source actuations therebetween (not illustrated). The source actuation 447-1 and/or the source actuation 447-2 do not have to be actual source actuations and can be interpolated source actuations.

The parameterization for the estimation of the acquisition effect 442 can include a source actuation interval 450 of 1000 source actuations. Other source actuation intervals 450 can be used. A source actuation interval 450 is essentially a sampling frequency over a number of source actuations for the parameterization. The sail line 446 is illustrated with a plurality of amplitudes, not exclusive to the source actuation interval 450. For example, amplitude 448-N is for a source actuation between the source actuation 447-1 and the source actuation 447-2. The source actuation interval 450 can constrain the amplitude of the estimate of the acquisition effect 442 by only allowing it to change linearly within segments equal to the source actuation interval 450. The source actuation interval 450 can be user-defined, which can allow the user to allow more aggressive changes to the contribution to the estimate of the acquisition effect 442 (of the RMS amplitude map 336 in FIG. 3) by decreasing the source actuation interval 450 and vice versa. In at least one embodiment, one constant value can be used for the entire sail line by setting the source actuation interval to be equal to the number of source actuations over the sail line 446.

$A_{acquisition}$ is a column vector with as many elements as source actuations. It is coupled to the acquisition by:

$$A_{acquisition} = W_1 S_1 \quad (2)$$

where $S_1$ is a column vector with element that represent the values of $A_{acquisition}$ at a subset of the plurality of source actuations according to a source actuation interval 450. $W_1$ is a matrix that linearly interpolates the values of the subset of the plurality of source actuations to the other source actuations within the source actuation sequence.

Figure 5B:
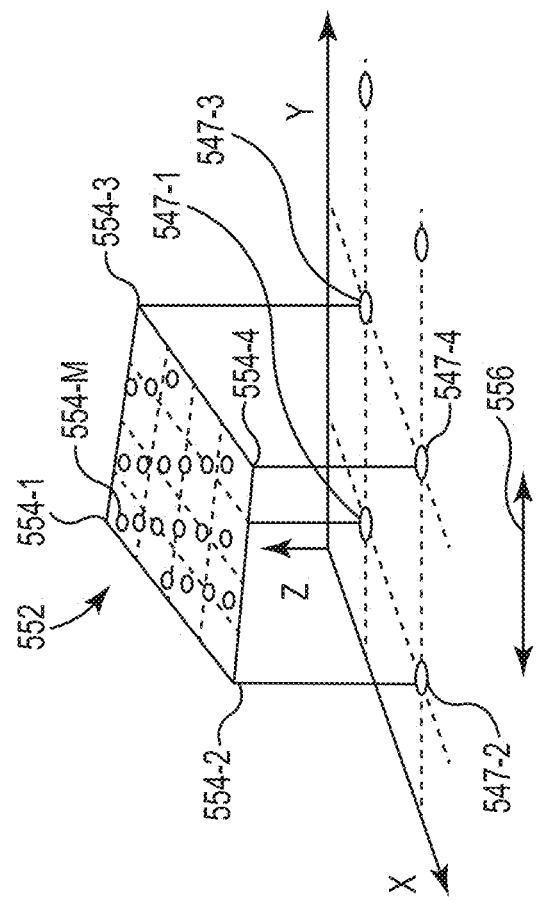
FIG. 5B illustrates the segment of FIG. 5A in more detail.
Figure 5A:
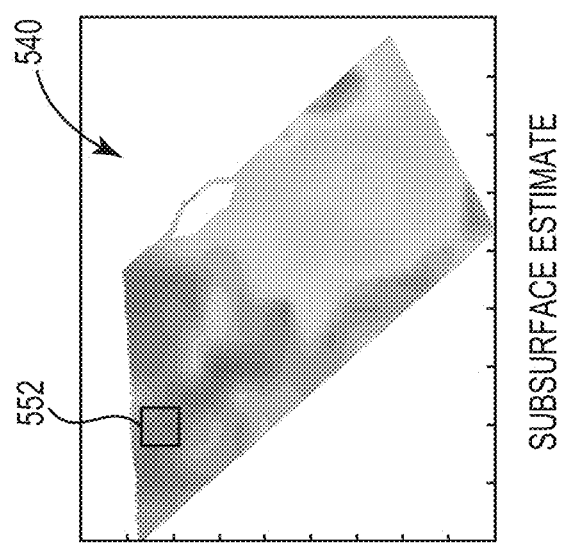
FIG. 5A illustrates the estimate of the subsurface effect of FIG. 3 with a segment identified.

FIG. 5A illustrates the estimate of the subsurface effect 540 of FIG. 3 with a segment 552 identified.

FIG. 5B illustrates the segment 552 of FIG. 5A in more detail. In FIG. 5B, the x-axis and the y-axis are geographic and correspond to an area subject to a marine survey. The z-axis is an indication of amplitude associated with each source actuation. For example, source actuation 547-1 is associated with the amplitude 554-1 on the parameterization of the estimated subsurface effect 540, source actuation 547-2 is associated with the amplitude 554-2, source actuation 547-3 is associated with the amplitude 554-3, and source actuation 547-4 is associated with the amplitude 554-4. Unlike FIG. 4B, FIG. 5B does not indicate any correspondence with time. Rather FIG. 5B indicates a correspondence with a geographic position. There may be other source actuations over geographic positions between the source actuations 547-1, 547-2, 547-3, 547-4 (not illustrated). For example, amplitude 554-M is for a source actuation between the source actuations 547-1, 547-2, 547-3, 547-4. The source actuation 547-1, the source actuation 547-2, the source actuation 547-3, and/or the source actuation 547-4 do not have to be actual source actuations and can be interpolated source actuations.

The parameterization for the estimation of the subsurface effect 540 can include a positional interval 556. For example, the positional interval 556 can be 2000 meters in each of the x-direction and the y-direction. Other positional intervals 556 can be used. A positional interval 556 is essentially a sampling frequency over a number of positions for the parameterization. The positional interval 556 can constrain the amplitude of the estimate of the subsurface effect 540 to be on the segment 552. That is, the amplitude can be constant across the segment 552. The positional interval 556 can be user-defined, which can allow the user to allow more aggressive changes to the contribution to the estimate of the subsurface effect 540 (of the RMS amplitude map 336 in FIG. 3) by decreasing the positional interval 556 and vice versa.

$A_{subsurface}$ can be a column vector with as many elements as source actuations. It is coupled to the subsurface by:

$$A_{subsurface} = W_2 S_2 \quad (3)$$

where $S_2$ is a column vector with elements that represent the value of $A_{subsurface}$ at points that are placed at a positional interval. For example, the positional interval can be every 2000 meters in an x-direction and a y-direction. $W_2$ is a matrix that interpolates the values at the positional intervals to the location of the source actuations.

FIG. 6A illustrates the root mean square amplitude map 636 of FIG. 3. The RMS amplitude map 636 is presented again for purposes of comparison between FIG. 6A, FIG.

6B, and FIG. 6C. The RMS amplitude map 636 is an input, while FIG. 6B and FIG. 6C illustrate outputs after removing the estimated acquisition effect.

FIG. 6B illustrates a first output 658-1 after removing the estimated acquisition effect. The first output 658-1 is the root mean square amplitude map of FIG. 6A after removal of the estimated acquisition effect of FIG. 4A therefrom according to a first parameterization. For example, the first parameterization can include a positional interval of 2000 meters and a source actuation interval 100 actuations.

In at least one embodiment of the present disclosure, a minimization procedure can be used to estimate the subsurface effect and the acquisition effect. Values of $S_1$ and $S_2$ can be estimated by minimization of the sum of the squared elements in:

$$J(S1,S2)=\Sigma(A_{input}-A_{subsurface}(S_2)-A_{acquisition}(S_1))^2 \quad (4)$$

where J is an objective function. The residual, if any, can be added to the estimation of $A_{subsurface}$ or the estimation of $A_{acquisition}$. To remove the acquisition effect from the marine survey measurement, the marine survey measurement for each source actuation can be divided by the exponent of the logarithmic value $A_{acquisition}$ for each source actuation.

In Equation 4, the total (the part that does change and the part that does not change) contributions of the subsurface effect and the acquisition effect are estimates and not the actual changes. However, the part that does not change of both the subsurface effect and the acquisition effect can be split arbitrarily between the two because a lack of change does not affect the desired results.

By changing the positional interval of $S_2$ in the x-direction and the y-direction (positional interval 556 in FIG. 5B) and/or the source actuation interval of $S_2$ (source actuation interval 450 in FIG. 4B), a balance between explaining the marine survey measurement in terms of $A_{subsurface}$, $A_{acquisition}$, and $A_{residual}$ can be found. This is illustrated by the difference between FIG. 6B and FIG. 6C.

FIG. 6C illustrates a second output 658-2 after removing the estimated acquisition effect. The second output 658-2 is the root mean square amplitude map of FIG. 6A after removal of the estimated acquisition effect of FIG. 4A therefrom according to a second parameterization. For example, the second parameterization can include a positional interval of 800 meters and a source actuation interval 200 actuations. As is evidenced by the difference between FIG. 6B and FIG. 6C, the second parameterization can allow for more variation in the subsurface (because the positional interval is smaller) and less in the acquisition (because the source actuation interval is larger) than the first parameterization.

FIG. 7A illustrates the root mean square amplitude map of FIG. 3 after a smoothing process according to at least one previous approach. A smoothing process can include two steps. A first step can let the subsurface amplitudes explain the input (the marine survey measurement). A second step can then let the acquisition amplitudes explain the remainder. An example output 760 of a smoothing process is illustrated in FIG. 7A for comparison purposes with an example output 758 according to at least one embodiment of the present disclosure illustrated in FIG. 7B.

FIG. 7B illustrates the same image as FIG. 6B for comparison to FIG. 7A. Inverting can allow both the subsurface effect and the acquisition effect simultaneously explain the input (the marine survey measurement). The output 758 in FIG. 7B clearly has less striping than the output 760 illustrated in FIG. 7A, evidencing some advantages of the present disclosure. At least one embodiment of the present disclosure can be applied to overlapping marine surveys and/or to four dimensional (4D) marine surveys.

Figure 8:
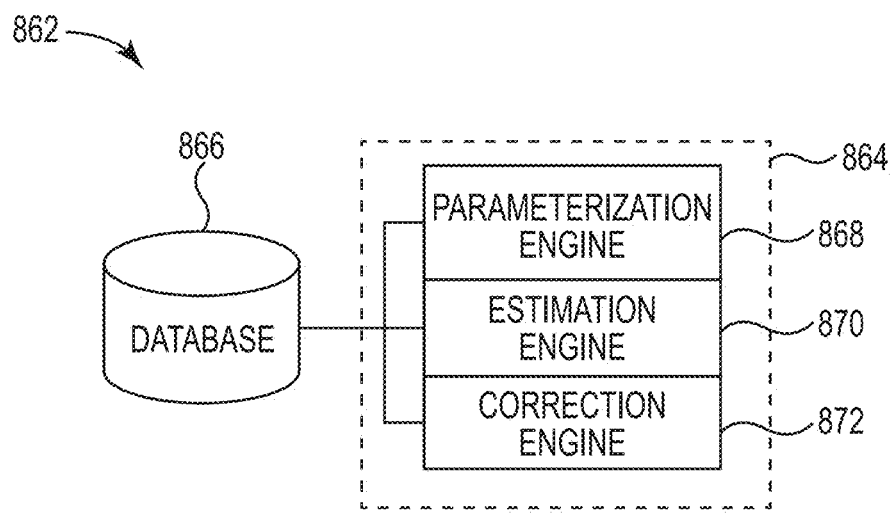
FIG. 8 illustrates a diagram of a system for removal of an estimated acquisition effect from a marine survey measurement.

FIG. 8 illustrates a diagram of a system 862 for removal of an estimated acquisition effect from a marine survey measurement. The system 862 can include a data store 866, a subsystem 864, and/or a number of engines (e.g., parameterization engine 868, estimation engine 870 and/or correction engine 872) and can be in communication with the data store 866 via a communication link. The system 862 can include additional or fewer engines than illustrated to perform the various functions described herein. The system can represent program instructions and/or hardware of a machine (e.g., machine 974 as referenced in FIG. 9, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium, etc., as well as hard-wired program such as logic. Hard-wired program instructions can be considered as both program instructions and hardware.

The parameterization engine 868 can include a combination of hardware and program instructions that is configured to parameterize an acquisition effect of a marine survey measurement as a function of time to define a parameterized acquisition effect and a subsurface effect of the marine survey measurement as a function of position to define a parameterized subsurface effect. The function of time can based on a plurality of source actuations for the marine survey measurement, a respective value of the acquisition effect at a subset of the plurality of source actuations according to a source actuation interval, and an interpolation between the plurality of source actuations and the plurality of source actuation intervals. The function of position can be based on the plurality of source actuations, a respective value of the subsurface effect at a plurality of positional intervals, and an interpolation between the plurality of source actuations and the plurality of positional intervals.

The estimation engine 870 can include a combination of hardware and program instructions that is configured to estimate the acquisition effect and the subsurface effect based on the parameterized acquisition effect and the parameterized subsurface effect to define an estimated acquisition effect and an estimated subsurface effect, respectively. The estimation engine 870 can be configured to minimize a sum of squares of an objective function that includes the marine survey measurement, the parameterized acquisition effect, and the parameterized subsurface effect to estimate the acquisition effect and the subsurface effect. The estimation engine 870 can be configured to combine the estimated acquisition effect and the estimated subsurface effect with a different estimated acquisition effect and a different estimated subsurface effect from a different marine survey measurement and to apply a constraint to a difference between the estimated subsurface effect and the different estimated subsurface effect based on a change to a subsurface between the marine survey measurement and the different marine survey measurement.

The correction engine 872 can include a combination of hardware and program instructions that is configured to remove the estimated acquisition effect from the marine survey measurement.

Figure 9:
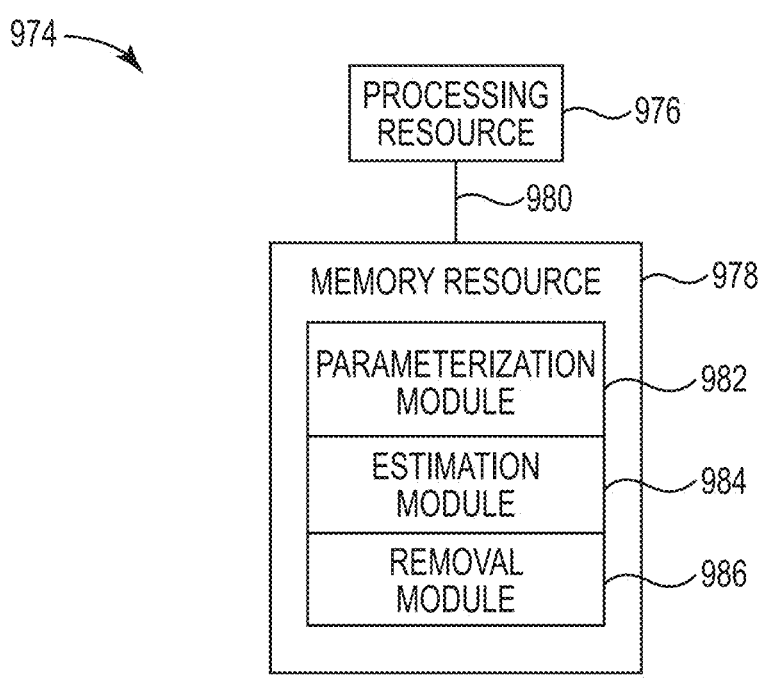
FIG. 9 illustrates a diagram of a machine for removal of an estimated acquisition effect from a marine survey measurement.

FIG. 9 illustrates a diagram of a machine 974 for removal of an estimated acquisition effect from a marine survey measurement. The machine 974 can utilize software, hardware, firmware, and/or logic to perform a number of functions. The machine 974 can be a combination of hardware and program instructions configured to perform a number of functions (e.g., actions). The hardware, for example, can include a number of processing resources 976 and a number of memory resources 978, such as a machine-readable medium or other non-transitory memory resources 978. The memory resources 978 can be internal and/or external to the machine 974, for example, the machine 974 can include internal memory resources and have access to external memory resources. The program instructions, such as machine-readable instructions, can include instructions stored on the machine-readable medium to implement a particular function, for example, an action such as removal of an estimated acquisition effect from a marine survey measurement. The set of machine-readable instructions can be executable by one or more of the processing resources 976. The memory resources 978 can be coupled to the machine 974 in a wired and/or wireless manner. For example, the memory resources 978 can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

Memory resources 978 can be non-transitory and can include volatile and/or non-volatile memory. Volatile memory can include memory that depends upon power to store information, such as various types of dynamic random access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid state drive, etc., as well as other types of non-transitory machine-readable media.

The processing resources 976 can be coupled to the memory resources 978 via a communication path 980. The communication path 980 can be local or remote to the machine 974. Examples of a local communication path 980 can include an electronic bus internal to a machine, where the memory resources 978 are in communication with the processing resources 976 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 980 can be such that the memory resources 978 are remote from the processing resources 976, such as in a network connection between the memory resources 978 and the processing resources 976. That is, the communication path 980 can be a network connection. Examples of such a network connection can include a local area network, wide area network, personal area network, and the Internet, among others.

As shown in FIG. 9, the machine-readable instructions stored in the memory resources 978 can be segmented into a number of modules 982, 984, 986 that when executed by the processing resources 976 can perform a number of functions. As used herein a module includes a set of instructions included to perform a particular task or action. The number of modules 982, 984, 986 can be sub-modules of other modules. For example, the estimation module 984 can be a sub-module of the parameterization module 982 and/or the estimation module 984 and the parameterization module 982 can be contained within a single module. Furthermore, the number of modules 982, 984, 986 can comprise individual modules separate and distinct from one another. Examples are not limited to the specific modules 982, 984, 986 illustrated in FIG. 9.

Each of the number of modules 982, 984, 986 can include program instructions and/or a combination of hardware and program instructions that, when executed by a processing resource 976, can function as a corresponding engine as described with respect to FIG. 8. For example, the parameterization module 982 can include program instructions and/or a combination of hardware and program instructions that, when executed by a processing resource 976, can function as the parameterization engine 868, the estimation module 984 can include program instructions and/or a combination of hardware and program instructions that, when executed by a processing resource 976, can function as the estimation engine 870, and/or the removal module 986 can include program instructions and/or a combination of hardware and program instructions that, when executed by a processing resource 976, can function as the correction engine 872.

The machine 974 can include a parametrization module 982, which can include instructions to parameterize an acquisition effect of a marine survey measurement as a function of time with a source actuation interval. The prediction module 984 can include instructions to parametrize a subsurface effect of the marine survey measurement as a function of position with a positional interval. The instructions can be executed to allow a user to specify a number of source actuations per source actuation interval and/or to specific a size of the positional interval in a first direction and a second direction orthogonal to the first direction.

The machine 974 can include an estimation module 984, which can include instructions to estimate the acquisition effect of the marine survey measurement as a function of position with a positional interval. In at least one embodiment, the instructions can be executed to estimate the acquisition effect based on a previous recording of a marine survey measurement. In at least one embodiment, the instructions can be executed to estimate the subsurface effect based on existing data associated with the subsurface.

The machine 974 can include a removal module 986, which can include instructions to remove the estimated acquisition effect from the marine survey measurement.

In accordance with a number of embodiments of the present disclosure, a geophysical data product may be produced. The geophysical data product may include, for example, a marine survey measurement with an estimated acquisition effect removed therefrom. Geophysical data may be obtained and stored on a non-transitory, tangible computer-readable medium. The geophysical data product may be produced by processing the geophysical data offshore or onshore either within the United States or in another country. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore. For example, an acquisition effect can be parameterized as a function of time and a subsurface effect can be parameterized as a function of position to define a parameterized acquisition effect and a parameterized subsurface effect, respectively, based on a marine survey measurement and the acquisition effect can be estimated based on the parameterized acquisition effect and the parameterized subsurface effect to define an estimated acquisition effect, for example as the marine survey measurement is being acquired or after it is acquired, offshore to facilitate other processing of the marine survey measurement either offshore or onshore. As another example, the estimated acquisition effect can be removed from the marine survey measurement, for example as it is being acquired or after it is acquired, offshore to facilitate other processing of the acquired marine survey measurement either offshore or onshore.

FIG. 10 illustrates a method flow diagram for removal of an estimated acquisition effect from a marine survey measurement. At block 1088, the method can include obtaining a respective RMS amplitude for each of a plurality of marine survey measurements, wherein a logarithmic value of the respective RMS amplitude is a sum of a subsurface effect and an acquisition effect. The logarithmic value of the respective RMS amplitude can be a sum of logarithmic values of the subsurface effect, the acquisition effect, and a residual. In at least one embodiment of the present disclosure, the method includes adding the residual to the estimated subsurface effect. Obtaining the respective RMS amplitude can include obtaining a respective position of the source actuation and/or a respective time of the source actuation.

At block 1090, the method can include parameterizing the acquisition effect as a function of time with a source actuation interval to define a parameterized acquisition effect. At block 1092, the method can include parameterizing the subsurface effect as a function of position with a positional interval in a first direction and in a second direction orthogonal to the first direction to define a parameterized subsurface effect.

At block 1094, the method can include estimating the acquisition effect and the subsurface effect based on the logarithmic value of the respective RMS amplitude, the parameterized acquisition effect and the parameterized subsurface effect to define an estimated acquisition effect. Estimating the acquisition effect and the subsurface effect can include minimizing a sum of squares of the logarithmic value of the respective RMS amplitude less the parameterized acquisition effect and the parameterized subsurface effect over the plurality of marine survey measurements. Estimating the acquisition effect can include interpolating between values of the acquisition effect corresponding to the source actuation interval according to the respective time. Estimating the subsurface effect can include interpolating between values of the subsurface effect corresponding to the positional interval according to the respective position.

At block 1096, the method can include removing the estimated acquisition effect from the plurality of marine survey measurements. In at least one embodiment, removing the estimated acquisition effect comprises dividing the plurality of marine survey measurements by an exponent of the estimated acquisition effect, wherein the estimated acquisition effect comprises a logarithmic value of an RMS amplitude. In at least one embodiment of the present disclosure, removing the estimated acquisition effect from the plurality of marine survey measurements comprises de-striping the respective RMS amplitude.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
   an inversion of an amplitude map for a marine survey measurement, the amplitude map being indicative of a subterranean formation, and the inversion comprising a sum of at least a subsurface effect and an acquisition effect;
   a parameterization engine configured to parameterize the acquisition effect as a function of time with a source actuation interval to define a parameterized acquisition effect and to parameterize the subsurface effect as a function of position with a positional interval to define a parameterized subsurface effect;
   an estimation engine configured to estimate the acquisition effect and the subsurface effect with a forward model based on the parameterized acquisition effect and the parameterized subsurface effect to define an estimated acquisition effect and an estimated subsurface effect, respectively; and
   a correction engine configured to remove the estimated acquisition effect from the amplitude map, making the amplitude map better indicative of the subterranean formation by better representing changes caused by the subsurface rather than acquisition;
   wherein the parameterization engine, the estimation engine, and the correction engine comprise hardware.

2. The system of claim 1, wherein the acquisition effect includes a change in the marine survey measurement attributable to a change in an acquisition circumstance; and
   wherein the subsurface effect includes a change in the marine survey measurement attributable to a change in a subsurface response.

3. The system of claim 2, wherein the acquisition circumstance comprises one or more of the group of acquisition circumstances consisting of:
   a temperature of a water column between the subsurface and a receiver;
   an acoustic property of the water column between the subsurface and a receiver;
   a source actuation frequency;
   a source actuation sequence;

a source pressure;
a source volume;
a source energy;
a receiver sensitivity; and
a phase of a source input signal.

4. The system of claim 1, wherein the function of time is based on a plurality of source actuations for the marine survey measurement, a respective value of the acquisition effect at a subset of the plurality of source actuations according to the source actuation interval, and an interpolation between the plurality of source actuations and the plurality of source actuation intervals.

5. The system of claim 4, wherein the function of position is based on the plurality of source actuations, a respective value of the subsurface effect at a plurality of positional intervals, and an interpolation between the plurality of source actuations and the plurality of positional intervals.

6. The system of claim 5, wherein the estimation engine is configured to minimize a sum of squares of an objective function that includes the marine survey measurement, the parameterized acquisition effect, and the parameterized subsurface effect to estimate the acquisition effect and the subsurface effect.

7. The system of claim 1, wherein the estimation engine is configured to:
combine the estimated acquisition effect and the estimated subsurface effect with a different estimated acquisition effect and a different estimated subsurface effect from a different marine survey measurement; and
apply a constraint to a difference between the estimated subsurface effect and the different estimated subsurface effect based on a change to a subsurface between the marine survey measurement and the different marine survey measurement.

8. A non-transitory machine-readable medium storing instructions executable by a processing resource to:
obtain an inversion of an amplitude map for a marine survey measurement, the amplitude map being indicative of a subterranean formation, and the inversion comprising a sum of at least a subsurface effect and an acquisition effect;
parameterize the acquisition effect as a function of time with a source actuation interval;
parameterize the subsurface effect as a function of position with a positional interval;
estimate the acquisition effect and the subsurface effect with a forward model based on the marine survey measurement, the parameterized acquisition effect, and the parameterized subsurface effect; and
remove the estimated acquisition effect from the amplitude map, making the amplitude map better indicative of the subterranean formation by better representing changes caused by the subsurface rather than acquisition.

9. The medium of claim 8, including instructions to allow a user to specify a number of source actuations per source actuation interval.

10. The medium of claim 9, including instructions to allow the user to specify a size of the positional interval in a first direction and a second direction orthogonal to the first direction.

11. The medium of claim 8, including instructions to estimate the acquisition effect based on a previous recording of a marine survey measurement.

12. The medium of claim 8, including instructions to estimate the subsurface effect based on existing data associated with a subsurface.

13. A method, comprising:
obtaining, by a machine, an inversion of a root mean square (RMS) amplitude map for a plurality of marine survey measurements, wherein a logarithmic value of the inversion of the RMS amplitude map is a sum of at least a subsurface effect and an acquisition effect, and wherein the RMS amplitude map is indicative of a subterranean formation;
parameterizing, by the machine, the acquisition effect as a function of time with a source actuation interval to define a parameterized acquisition effect;
parameterizing, by the machine, the subsurface effect as a function of position with a positional interval in a first direction and in a second direction orthogonal to the first direction to define a parameterized subsurface effect;
estimating, by the machine, the acquisition effect and the subsurface effect with a forward model based on the logarithmic value of the respective RMS amplitude, the parameterized acquisition effect and the parameterized subsurface effect to define an estimated acquisition effect; and
removing, by the machine, the estimated acquisition effect from the RMS amplitude map, making the RMS amplitude map better indicative of the subterranean formation by better representing changes caused by the subsurface rather than acquisition.

14. The method of claim 13, wherein estimating the acquisition effect and the subsurface effect comprises minimizing a sum of squares of the logarithmic value of the respective RMS amplitude less the parameterized acquisition effect and the parameterized subsurface effect over the plurality of marine survey measurements.

15. The method of claim 13, wherein the logarithmic value of the respective RMS amplitude is a sum of logarithmic values of the subsurface effect, the acquisition effect, and a residual; and
wherein the method includes adding the residual to the estimated subsurface effect.

16. The method of claim 13, wherein removing the estimated acquisition effect comprises dividing the plurality of marine survey measurements by an exponent of the estimated acquisition effect, wherein the estimated acquisition effect comprises a logarithmic value of an RMS amplitude.

17. The method of claim 13, wherein obtaining the respective RMS amplitude further includes obtaining:
a respective position of the source actuation; and
a respective time of the source actuation.

18. The method of claim 17, wherein estimating the acquisition effect comprises interpolating between values of the acquisition effect corresponding to the source actuation interval according to the respective time.

19. The method of claim 17 wherein estimating the subsurface effect comprises interpolating between values of the subsurface effect corresponding to the positional interval according to the respective position.

20. The method of claim 13, wherein removing the estimated acquisition effect from the plurality of marine survey measurements comprises de-striping the respective RMS amplitude.

21. The method of claim 13, wherein the plurality of marine survey measurements comprise a four dimensional (4D) marine survey.

22. A method of generating a geophysical data product, the method comprising:

obtaining an inversion of an amplitude map for a marine survey measurement, the amplitude map being indicative of a subterranean formation, and the inversion comprising a sum of at least a subsurface effect and an acquisition effect;

parameterizing the acquisition effect as a function of time with a source actuation interval and parameterizing the subsurface effect as a function of position with a positional interval to define a parameterized acquisition effect and a parameterized subsurface effect, respectively;

estimating the acquisition effect and the subsurface effect with a forward model based on the parameterized acquisition effect and the parameterized subsurface effect to define an estimated acquisition effect;

removing the estimated acquisition effect from the amplitude map, making the marine survey measurement better indicative of the subterranean formation by better representing changes caused by the subsurface rather than acquisition; and recording the marine survey measurement having the estimated acquisition effect removed therefrom on a non-transitory machine readable medium.

23. The method of claim 22, wherein the method is performed offshore or onshore.

* * * * *